United States Patent [19]

Brandt et al.

[11] 4,379,918

[45] Apr. 12, 1983

[54] PROCESS FOR PREPARING WATER-SOLUBLE PHOSPHONOMETHYL ETHERS OF CELLULOSE

[75] Inventors: Lothar Brandt; Arno Holst, both of Wiesbaden, Fed. Rep. of Germany

[73] Assignee: Hoechst Aktiengesellschaft, Frankfurt am Main, Fed. Rep. of Germany

[21] Appl. No.: 313,350

[22] Filed: Oct. 20, 1981

[30] Foreign Application Priority Data

Oct. 23, 1980 [DE] Fed. Rep. of Germany ....... 3039978

[51] Int. Cl.$^3$ .......................... C08B 11/00; C08L 1/26
[52] U.S. Cl. ......................................... 536/62; 8/120; 536/84; 536/88
[58] Field of Search ................... 536/62, 84, 88; 8/120

[56] References Cited

U.S. PATENT DOCUMENTS

| | | | |
|---|---|---|---|
| 2,979,374 | 4/1961 | Drake et al. | 8/120 |
| 3,388,118 | 6/1968 | Tesoro | 536/62 |
| 3,553,194 | 1/1971 | Verbanac et al. | 536/62 |
| 3,634,394 | 1/1972 | Andreassen | 536/62 |
| 3,652,540 | 3/1972 | Determann et al. | 536/62 |
| 4,017,671 | 4/1977 | Schminke et al. | 536/98 |
| 4,020,271 | 4/1977 | Chatterjee | 536/88 |

FOREIGN PATENT DOCUMENTS 2557576  6/1977  Fed. Rep. of Germany .

OTHER PUBLICATIONS

"Phosphonomethylation of Cotton" by G. L. Drake, W. A. Reeves, J. D. Guthrie, published in Textile Research Journal, Mar. 1959, pp. 270–275.
*Abstract Bulletin of the Institute of Paper Chemistry*, vol. 41, No. 1, Jul. 1970, abstract No. 2007(u) at p. 202 European Search Report.

*Primary Examiner*—Ronald W. Griffin
*Attorney, Agent, or Firm*—Schwartz, Jeffery, Schwaab, Mack, Blumenthal & Koch

[57] ABSTRACT

Disclosed is a process for preparing water-soluble phosphonomethyl ethers of cellulose from cellulose and halogenomethane phosphonic acid or one of its salts or acid derivatives, in an aqueous, alkaline medium. The process is carried out in such a way that, for each mole of the cellulose, from about 2.1 to 15 moles of hydroxide ions and from about 0.4 to 3.0 moles of halogenomethane phosphonate ions as etherifying agent are caused to react in from about 3 to 50 parts by weight, per part by weight of the cellulose, of a mixture which is composed of an inert, preferably water-miscible organic solvent and water and in which the proportion of water ranges from about 2 to 60 percent by weight, the reaction is continued until the phosphonomethyl cellulose has a DS of at least about 0.13.

17 Claims, No Drawings

PROCESS FOR PREPARING WATER-SOLUBLE PHOSPHONOMETHYL ETHERS OF CELLULOSE

BACKGROUND OF THE INVENTION

The present invention relates to a process for preparing water-soluble phosphonomethyl ethers of cellulose (PMC) in an aqueous, alkaline medium which contains an organic solvent.

Cellulose ethers which carry an anion-active substituent are used in many processes and fields of application, as water-soluble thickening agents and/or as auxiliaries, e.g., as a protective colloid, flocculating agent, binder and adhesive, dispersing agent or film-forming agent. Among these fields of application are the making of paper, the production and application of building materials, the processing of fibers, the preparation of pharmaceuticals and cosmetics and the production of soaps and detergents, varnishes and paints, and food and luxury food. The best known commercial product of this type of cellulose ether is carboxymethyl cellulose (CMC) which is conventionally marketed in the form of its Na salt (NaCMC). Also gaining a certain importance are other carboxyalkyl ethers or sulfoalkyl ethers of cellulose and mixed ethers which contain further ether groups in addition to the monobasic anion-active substituent, normally carboxymethyl.

Organic phosphonic acids or their derivatives lend themselves particularly well to the purpose of linking polybasic anion-active substituents to the cellulose molecule. Cellulose reacting with phosphoric acid yields cellulose phosphates as a result of direct ester-linkage of the cellulose molecule to the phosphoric acid. By reaction with reactive, organic phosphonic acids or derivatives, e.g., halogeno-alkane phosphonic acids, cellulose ethers are produced which have a phosphonic acid group or one of its salts in their ether substituent, i.e., the cellulose molecule is linked to the phosphonic acid group via an oxygen bridge and an organic bridge. The cellulose phosphates can be easily hydrolized and are readily crosslinked. In comparison, the cellulose ethers are stable compounds in which crosslinking does not readily occur. These cellulose ethers which contain phosphonic acid groups are normally insoluble in water, since reaction with halogeno-alkane phosphonic acids resulting in more than very low degrees of substitution is difficult. However, water-soluble products have also been disclosed.

Both U.S. Pat. No. 2,979,374 and the paper "Phosphonomethylation of Cotton" by G. L. Drake, W. A. Reeves and J. D. Guthrie, published in Textile Research Journal, March 1959, pages 270 to 275, describe chemically modified, fibrous cellulose-based textile materials and a process of preparing these materials, in which certain of the hydroxyl groups of the polysaccharide are replaced by $-O-CH_2-PO_3X_2$ groups, wherein X is either H or an alkali metal or $NH_4$. The degree of modification ranges from 0.01 to 4 percent by weight. In the process for the preparation of these products, the fibrous starting material is reacted with an aqueous solution of an alkali metal salt of chloromethane phosphonic acid or another salt of this acid and an excess of alkali metal hydroxide. The products obtained may further be converted to the free acid derivative or to the corresponding ammonium salts. It is also possible to prepare water-soluble phosphonomethyl ethers of cellulose, if the degree of modification is chosen in such a way that at least 2 percent by weight of phosphorus are introduced. The starting materials mentioned are cotton fibers, cellulose hydrate fibers, aminized cotton fibers, carboxymethylated cotton fibers, paper and sulfoethylated cotton fibers. For the purpose of introducing the phosphonomethyl groups, either a metal salt of chloromethane phosphonic acid itself or of its acid chloride may be used; it is also possible to use the corresponding monoesters of diesters. The aqueous reaction solution contains from 10 to 30 percent by weight of reactive alkali metal hydroxide and from 1 to 30 percent by weight of the alkali metal salt of chloromethane phosphonic acid. The reaction is conducted by allowing the cotton to absorb from 125 to 200 percent by weight of the reaction solution and heating to a temperature from 75° to 115° C. for 5 to 30 minutes or heating to 140° to 160° C. for 2 to 10 minutes. The water-soluble products are obtained from reaction solutions containing from 20 to 25 percent by weight of NaOH and from 10 to 20 percent by weight of chloromethane phosphonic acid, at temperatures from 120° to 150° C. applied for 5 to 30 minutes. In the only example of preparing a water-soluble phosphonomethyl cellulose, cotton is treated with a solution consisting of 35.1 parts by weight of chloromethane phosphonic acid, 96.5 parts by weight of NaOH and 180 parts by weight of water, until it has absorbed 196 percent by weight of the solution. Heating to 140° C. for 30 minutes is followed by washing in water which contains 20 percent by weight of ethanol. Depending on the kind of starting material used, the phosphorus content determined in the water-soluble product amounts to 2.12 or 2.4 percent by weight.

The crosslinked phosphonoalkyl celluloses according to German Offenlegungsschrift No. 26 00 930 (corresponding to U.S. Pat. No. 4,020,271) comprise basic molecules of a kind which, without crosslinking, would themselves be water-soluble, but which are rendered substantially water-insoluble by crosslinking with formaldehyde, epichlorohydrin, dichloroacetic acid, diepoxides or other known difunctional components. With respect to carrying out the etherification stage, reference is made to the previously mentioned U.S. Pat. No. 2,979,374.

German Offenlegungsschrift No. 14 93 227 (corresponding to U.S. Pat. No. 3,388,118) discloses a method of preparing modified polysaccharides, in which chloroacetamido methyl cellulose or a similar compound containing reactive halogen is first prepared, and this intermediate compound is then reacted with trialkyl phosphites. The products obtained are not cellulose ethers; they contain nitrogen and phosphorus in substituent groups. The first reaction stage is run in an aqueous solution of, for example, N-methylol chloroacetamide and the second reaction stage in a solution of the phosphite in dimethyl formamide (DMF). The reaction products are insoluble in water.

The methods for the preparation of ion exchangers according to German Auslegeschrift No. 20 05 407 (corresponding to United States Patent No. 3,634,394) or according to German Auslegeschrift No. 20 05 408 (corresponding to United States Patent No. 3,652,540) can also result in products which carry a phosphonomethyl group. In one method, for example, pearls of regenerated cellulose are reacted in toluene in the presence of benzethonium chloride [$CH_3C(CH_3)_2-CH_2-C(CH_3)_2-C_6H_4-(O-CH_2-CH_2)_2-N^{\oplus}(CH_3)_2-CH_2-C_6H_5$, $Cl^{\ominus}$] with a solution containing NaOH, $NaBH_4$, water and chloromethane phosphonic acid for 16 hours at a temperature of 90° C. The product obtained is insoluble in water.

In the known process for the preparation of water-soluble phosphonomethyl ethers of cellulose (PCM), temperatures exceeding 100° C. must be applied, in order to activate the halogenomethane phosphonic acid or one of its salts, respectively, which is slower to react than other etherifying reagents (for example, monochloro acetic acid). Any water which is present in the reaction medium is largely evaporated in the course of the reaction and, as a result, the etherification reaction proceeds in an almost-dry mixture. Experience has shown that in such "dry" processes in which the alkali cellulose swells slightly, non-uniform etherified products with high proportions of unsubstituted chain portions are in most cases obtained. This applies in particular to products which have a low degree of substitution (e.g., a DS of less than 0.4)—as in the present case. If it is intended to prepare water-soluble cellulose ethers, this will lead to products which give turbid, fibrous solutions showing residues, even at degrees of substitution which are actually sufficient to impart solubility in water, and the products are, therefore, unsuitable for many fields of application. The high temperatures employed also have an unfavorable effect on the stability of the polymer chain, since an oxidative chain-disintegration may occur. As a result, the cellulose ethers thus prepared, when dissolved, will yield only low viscosities and are consequently hardly suitable, for example, for use as thickening agents.

The other previously disclosed processes do not lead to water-soluble phosphonomethyl celluloses or to ether groupings, respectively. Furthermore, they are also either conducted at a temperature above 100° C. and with the aid of a "coupling component" or at a temperature below 100° C., but with the addition of several auxiliary substances and at long reaction times.

SUMMARY OF THE INVENTION

Accordingly, it is an object of the present invention to provide a process which makes it possible to prepare, in an economical way, a low-residue, water-soluble PMC, at a lower temperature and without any appreciable chain-disintegration.

It is also an object of the present invention to provide a process for producing phosphonomethyl cellulose of more uniform substitution.

It is a further object of the present invention to produce phosphonomethyl cellulose products having viscosities great enough for use as thickening agents.

In accomplishing the foregoing objects, there has been provided in accordance with the present invention a process for producing water-soluble phosphonomethyl ethers of cellulose, comprising the steps of reacting cellulose or a cellulose derivative with halogenomethane phosphonic acid or a salt thereof or an acid derivative thereof which provides halogenomethane phosphonate ions, the reaction being carried out in an aqueous alkaline medium containing hydroxide ions, such that from about 2.1 to 15 moles, more preferably from about 2.5 to 8 moles, of hydroxide ions, and from about 0.4 to 3 moles, more preferably from about 0.6 to 1.5 moles, of halogenomethane phosphonate ions per mole of cellulose are reacted in about 3 to 50, more preferably about 5 to 20 parts by weight, per part by weight of the cellulose, of a mixture comprising an inert, preferably water-miscible, organic solvent, advantageously isopropanol, and from about 2 to 60 percent, more preferably from about 3 to 40 percent, by weight of water; and continuing the reaction at a temperature from about 70° C. to 100° C. until the phosphonomethyl cellulose has a DS of at least about 0.13, and more preferably at least about 0.18.

According to the present invention, the reacting step comprises the steps of alkalizing the cellulose in the alkaline medium as an alkalizing agent to produce an alkali cellulose intermediate, and thereafter etherifying the intermediate in an etherification step with the halogenomethane phosphonic acid or a salt thereof or an acid derivative thereof as an etherifying agent to produce phosphonomethyl cellulose.

In one embodiment of the present invention, the alkalizing agent and the etherifying agent are introduced into the reaction mixture simultaneously.

In another embodiment of the present invention, the etherifying agent is introduced into the reaction mixture subsequently to the alkalizing agent.

Further objects, features and advantages of the present invention will become apparent from the detailed description of preferred embodiments which follows.

DETAILED DESCRIPTION OF PREFERRED EMBODIMENTS

The invention is based on the process of preparing water-soluble phosphonomethyl ethers of cellulose from cellulose and halogenomethane phosphonic acid or one of its salts or acid derivatives, in an aqueous, alkaline medium. The process of the invention has the feature that, for each mole of the cellulose, from about 2.1 to 15 moles of hydroxide ions,
and
from about 0.4 to 3 moles of halogenomethane phosphonate ions as etherifying agent
are caused to react in from about 3 to 50 parts by weight, per part by weight of the cellulose, of a mixture which is composed of an inert, preferably water-miscible organic solvent and water, in which the proportion of water ranges from about 2 to 60 percent by weight. The reaction is continued until the phosphonomethyl cellulose has a DS of at least about 0.13.

A preferred embodiment of the process according to this invention is carried out in such a way that, for each mole of the cellulose, from about 2.5 to 8 moles of hydroxide ions and from about 0.6 to 1.5 moles of halogenomethane phosphonate ions as etherifying agent are caused to react in from about 5 to 20 parts by weight, per part by weight of the cellulose, of a mixture of an inert, preferably water-miscible organic solvent and water, in which the proportion of water ranges from about 3 to 40 percent by weight. The reaction is continued until the phosphonomethyl cellulose has a DS of at least about 0.18. The process may proceed discontinuously or continuously in an apparatus of the type which is conventionally used in cellulose ether chemistry. If the temperature of the reaction mixture is chosen so as to exceed the boiling temperature of the solvent/$H_2O$ mixture, it is advisable to run the process of the invention in a pressure apparatus.

The specified combination of the reaction mixture merely gives the sum of the portions of components required for the reaction at the beginning of the etherifying stage. In the case of a separate alkalizing stage, for example, a part of the cellulose and of the alkali metal hydroxide is, at this point, already present as alkali cellulose, and by the neutralization of the etherifying agent, which is employed in the form of an acid, a hydrolizable acid derivative or a monosalt, additional water is generated. In addition to being used in the acid form, the etherifying agent may also be in the form of the monosalt or disalt or of another derivative which can be hydrolized under alkaline conditions. A preliminary partial neutralization of the acid function(s) in intermediate stages is also possible, and in that case, the required quantity by weight, is naturally, higher than the quantities which must be used for the free acid, i.e., the term "halogenomethane phosphonate ions" has been chosen to have a uniform basis for calculation. The specified quantity of "hydroxide ions" relates to the quantity required for alkalization and etherification; the quantity of "hydroxide ions" which is necessary to neutralize any hydrogen ions which are still present in the etherifying agent or to carry out hydrolisis must still be added to this.

The cellulose used is either of natural origin, e.g., cotton linters or wood pulp, or is in the regenerated form, e.g., cellulose hydrate. If possible, the cellulose should have a particle size of less than about 2.5 mm, more particularly less than about 1 mm, before the reaction is started, and this particle size can, for example, be attained by grinding the cellulose supplied with longer fibers into "powders".

The "hydroxide ions" are preferably used as alkali metal hydroxide—normally NaOH, but also KOH or LiOH—in a solid form or dissolved as an aqueous alkali metal hydroxide solution. It is, however, also possible to employ quaternary ammonium bases. Suitable inert organic solvents which are preferably miscible with water are, in particular, isopropanol, acetone, dioxane, tert.-butanol, or mixtures of these solvents, which may already be in a water-mixed state. If the particularly preferred isopropanol is used as the organic solvent, the mixture of solvent/$H_2O$ should be adjusted so that the proportion of water ranges from about 3 to 20 percent by weight, especially from about 5 to 13 percent by weight. Recovery and reuse of the particularly preferred isopropanol are relatively easy, because the liquid constituents of the etherification mixture, which are mechanically separated from the solid constituents, e.g., by filtering off, decanting or centrifuging, after completion of the etherification, frequently consist of isopropanol/$H_2O$ mixtures which are of such a kind that they can be reused for preparing the reaction mixture, directly or after the addition of a small quantity of anhydrous isopropanol. Purifying methods in which distillation is employed are also feasible to recover the organic portion of the solvent in an ecologically acceptable manner, and these methods are appropriately used in the present process to separate the solvent from the salts produced in the neutralization and reaction procedures.

In lieu of chloromethane phosphonic acid or its monosodium salt or disodium salt, which is preferably to be used as the etherifying agent, i.e., for the production of the halogenomethane phosphonate ions, it is also possible to use derivatives (e.g., acid chlorides or esters) thereof which can be hydrolized under alkaline conditions, or other soluble salts, for example, potassium or ammonium salts, or the corresponding bromo or iodomethane phosphonic acids or their derivatives or salts. In order to obtain etherification products which are water-soluble, i.e., which contain not more than about 10 percent by weight, particularly not more than about 5 percent by weight of water-insoluble constituents, the degree of substitution (DS, i.e., the average number of substituted OH groups per anhydro-D-glucose unit, which is between 0.0 and 3.0) should be at least about 0.13. In that case, the phosphonomethyl cellulose (PMC) can completely or almost completely be dissolved in water. In the first place, for reasons of process economy, i.e., a reasonable proportion of the quantity of etherifying agent used, DS values exceeding about 1.2 do not yield further decisive advantages. Preferably, the DS value ranges between about 0.18 and 0.8. If chloromethane phosphonic acid and NaOH are used, the following quantities by weight (relative to 1 part by weight of the cellulose) correspond approximately to the quantitative proportions of etherifying agent and hydroxide ions required for etherification, which are specified above in moles: from about 0.3 to 2.3 parts by weight, preferably from about 0.4 to 1.2 parts by weight of etherifying agent and from about 0.2 to 11 parts by weight, preferably from about 0.3 to 5.5 parts by weight of NaOH.

In the reaction, the reaction products are normally first obtained as dibasic salts, and by the addition of an acid, for example, in the case of neutralization with acetic acid up to the neutral range (pH from 5 to 8), these dibasic salts can be converted to the monobasic salt form or, for example, in the case of an excess addition of a mineral acid, to the free acid. By adding bases, such as a metal hydroxide or ammonium hydroxide, salts can again be produced from the monobasic salt forms or the free acid.

When the process of the present invention is carried out in practice, the cellulose is appropriately first alkalized in a mixture of organic solvent, water and alkali metal hydroxide (or quarternary ammonium base), and the etherifying agent is subsequently added. It is, however, also possible to alkalize in the absence of an organic solvent which is then added in the etherifying stage only, or to add the entire quantity of alkali metal hydroxide in the etherifying stage which is then, simultaneously, the alkalizing stage, i.e., separate alkalizing is not necessary in that case. All stages, no matter whether they are carried out as separate alkalizing or etherifying stages or as a combination of the two stages, are usually conducted in an apparatus equipped with a stirrer. In the separate alkalizing stage, room temperature is normally used (from about 15° to 35° C.), while etherification is particularly successfully run at a temperature ranging from about 75° to 100° C., especially from about 80° to 90° C. If alkalization and etherification are carried out in a single stage, room temperature can first be applied for some minutes, before the temperature is raised to the final temperature required for etherification. If the organic solvent is isopropanol and the process is to be conducted without the use of pressure units, it is advisable to operate below the boiling temperature of the 87 percent strength azeotropic mixture of isopropanol/$H_2O$, which is 82° C. Although it is known from the other processes of preparing water-soluble cellulose ethers that certain organic solvents can cause an equalization of substitution along the polysaccharide chain (possibly by positively influencing the swelling of the alkali cellulose), it has nevertheless not been possible, in these processes, to reduce the required minimum temperature as compared with corresponding processes without organic solvent (e.g., the so-called "dry" processes) and it is, therefore, particularly surprising that in the process according to the present invention, it is possible and even especially advantageous to carry out the reaction at temperatures below 100° C. Depending on the reaction temperature, the times required in the etherification stage generally range between about 30 minutes and 8 hours; for example, at 80° C. an etherification time of at least about 2 hours is necessary, whereas at 90° C. in a pressure apparatus, a period of about 45 minutes is sufficient. In a separating device (for example, a centrifuge), the crude product is, after adding an acid to prepare the monobasic salt form or the free acid if such step is required, freed from its liquid constituents and washed salt-free several times, preferably by means of an aqueous alcohol. The product is then dried and can either be ground, mixed with further components or granulated. These processing, purifying and post-treating methods are conventionally practiced in cellulose ether synthesis and it is, consequently, not necessary to describe them in detail.

The process parameters and the quantitative proportions of the components used or generated are subject to the following basic conditions:

An excessive water content in the reaction mixture causes a marked reduction in the efficiency of the etherification reaction.

A water content which is too low reduces the swelling of the alkali cellulose and will thus lead to non-uniform substitution.

An alkali content which is too low, for example, of less than 2 moles of NaOH per mole of the etherifying agent used, results in very low substitution yields. The upper limit of the amount of alkali employed is mainly determined by technical and economical aspects.

Greater quantities of extraneous electrolytes which are generated in the reaction or which are present from the start, e.g., NaCl, have the effect of lowering the yield. The same effect is also brought about by excessive quantities of etherifying agent and can only approximately be compensated for by a simultaneous increase of the proportions of alkali metal hydroxide and organic solvent. An unrestricted increase of these quantities is naturally disadvantageous for economical reasons.

The substitution yield of phosphonomethylation, i.e., the actually obtained DS value, relative to the molar quantity of the etherifying agent used per mole of the anhydro-D-glucose unit of the cellulose, can amount to 40 percent and above in the process according to the present invention. If less than about 0.4 mole of etherifying agent is used, the substitution yeild can even be increased to higher values, but the DS values which are then achievable are too low for a product having good solubility in water. If, on the other hand, the quantity of etherifying agent is substantially higher than about 2 moles, the substitution yield decreases again.

The phosphonomethyl celluloses (PMC) which can be prepared according to the process of this invention are suitable for the technical applications known for other anion-active cellulose ethers, such as CMC. The neutral aqueous solutions of the phosphonomethyl celluloses show a weak thixotropy. If polyvalent metal ions, for example $Ca^{2+}$ or $Al^{3+}$, are added, the phosphonomethyl celluloses are separated in flakes from their neutral solutions.

In the following examples, parts by weight are related to parts by volume as the g to the $cm^3$, and percentages are by weight.

The viscosity values specified are determined in a Hoeppler viscosimeter in a 2 percent strength aqueous solution at 20° C.

EXAMPLE 1

50 parts by weight of pine pulp having an average particle size of 0.5 mm are suspended in 1100 parts by volume (=865 parts by weight) of 100% strength isopropanol, and after adding 205 parts by weight of a 43.5% strength aqueous NaOH solution (=7.7 moles per 1 mole of the cellulose) the suspension is alkalized for 30 minutes at room temperature, while stirring. Etherification is conducted at 80° C. during 5 hours, using 90 parts by weight of the monosodium salt of chloromethane phosphonic acid (=2.0 moles per 1 mole of the cellulose). The mixture is then cooled and neutralized with acetic acid, with phenolphthalein being used as the indicator, and the solid reaction products are separated from the liquid constituents. The solid residue is suspended in 500 parts by volume of a 70% strength aqueous isopropanol and the solid phase is again separated from the liquid phase. This procedure is repeated until the liquid phase is virtually free of salt. After drying at 70° C., the solid reaction product is ground into a powder. 71 parts by weight of a PMC having a DS of 0.61 are obtained as the mono-Na-salt, and the PMC is soluble in water, leaving a residue of about 3% by weight of insoluble constituents. The viscosity is 90 mPa.s. Aqueous solutions are weakly thixotropic.

EXAMPLE 2

50 parts by weight of beech pulp having an average particle size of 0.5 mm are suspended in 675 parts by volume (=700 parts by weight) of 100% strength dioxane, and after adding 79 parts by weight of a 37% strength aqueous NaOH solution (=2.5 moles per 1 mole of the cellulose), the suspension is alkalized for 60 minutes at room temperature, while stirring. Etherification is conducted at 90° C. for 3 hours, using 23 parts by weight of the monosodium salt of chloromethane phosphonic acid (=0.5 mole per 1 mole of the cellulose). The reaction mixture is further processed as specified in Example 1. The mono-Na-salt of PMC is obtained in a quantity of 52 parts by weight. It has a DS of 0.14, is soluble in water leaving a residue of about 8%, and has a viscosity of 970 mPa.s.

EXAMPLE 3

50 parts by weight of the beech pulp according to Example 2 are suspended in 1140 parts by volume (=895 parts by weight) of 100% strength isopropanol, and after adding 112 parts by weight of a 50% strength aqueous NaOH solution (=4.8 moles per 1 mole of the cellulose), the suspension is alkalized for 45 minutes at room temperature, while stirring. Etherification is conducted at 80° C. for 3 hours, using 45 parts by weight of the monosodium salt of chloromethane phosphonic acid (=1.0 mole per 1 mole of the cellulose). The reaction mixture is further processed as described in Example 1. The mono-Na-salt of PMC is obtained in a quantity of 57 parts by weight. It has a DS of 0.28, is soluble in water leaving a residue of about 1%, and has a viscosity of 474 mPa.s, with an obvious thixotropy of the aqueous solution.

What is claimed is:

1. A process for preparing water-soluble phosphonomethyl ethers of cellulose, comprising the steps of:

reacting cellulose or a cellulose derivative wiith halogenomethane phosphonic acid or a salt thereof or an acid derivative thereof which provides halogenomethane phosphonate ions, said reaction being carried out in an aqueous alkaline medium containing hydroxide ions, wherein from about 2.1 to 15 moles of hydroxide ions, and
from about 0.4 to 3 moles of halogenomethane phosphonate ions per mole of cellulose are reacted in about 3 to 50 parts by weight, per part by weight of the cellulose, of a mixture comprising an inert organic solvent and from about 2 to 60 percent by weight of water; and continuing the reaction until the phosphonomethyl cellulose has a DS of at least about 0.13.

2. A process as defined in claim 1, wherein said organic solvent is water-miscible.

3. A process as defined in claim 1, wherein said organic solvent comprises isopropanol.

4. A process as defined in claim 1, wherein said alkaline medium comprises an alkali metal hydroxide selected from sodium hydroxide, potassium hydroxide or lithium hydroxide.

5. A process as defined in claim 4, wherein said alkali metal hydroxide comprises sodium hydroxide.

6. A process as defined in claim 1, wherein said reacting step comprises the separate steps of alkalizing said cellulose in said alkaline medium as an alkalizing agent to produce an alkali cellulose intermediate, and thereafter etherifying the intermediate in an etherification step with said halogenomethane phosphonic acid or a salt thereof or an acid derivative thereof as an etherifying agent to produce phosphonomethyl cellulose.

7. A process as defined in claim 6, wherein said alkalizing agent and said etherifying agent are introduced to said reaction simultaneously.

8. A process as defined in claim 6, wherein said etherifying agent is introduced in said reaction subsequently to said alkalizing agent.

9. A process as defined in claim 7 or 8, wherein said etherification reaction is conducted at a temperature of from about 70° C. to 100° C.

10. A process as defined in claim 1, wherein from about 2.5 to 8 moles of hydroxide ions, and from about 0.6 to 1.5 moles of halogenomethane phosphonate ions per mole of cellulose are reacted in about 5 to 20 parts by weight, per part by weight of said cellulose, of said mixture comprising said inert organic solvent and from about 3 to 40 percent by weight of water, and said reaction is continued until said phosphonomethyl cellulose has a DS of at least about 0.18.

11. A process as defined in claim 1 or 6, wherein said organic solvent comprises isopropanol and said etherifying agent comprises chloromethane phosphonic acid or its monosodium or disodium salt.

12. A process as defined in claim 1, wherein said cellulose has a particle size less than about 2.5 mm.

13. A process as defined in claim 1, wherein said cellulose has a particle size less than about 1.0 mm.

14. A process as defined in claim 1, wherein said cellulose is of natural origin.

15. A process as defined in claim 1, wherein said cellulose is in regenerated form.

16. A process as defined in claim 6, wherein the time required for said etherification step is from about 0.5 to 8 hours.

17. A process as defined in claim 6, wherein said alkalization step is carried out at room temperature.

* * * * *